US007886228B2

(12) United States Patent
Balabanovic et al.

(10) Patent No.: US 7,886,228 B2
(45) Date of Patent: *Feb. 8, 2011

(54) METHOD AND APPARATUS FOR STORYTELLING WITH DIGITAL PHOTOGRAPHS

(75) Inventors: Marko Balabanovic, London (GB); Lonny L. Chu, Palo Alto, CA (US); Gregory J. Wolff, Redwood City, CA (US)

(73) Assignee: Ricoh Co., Ltd., Tokyo (JP)

( * ) Notice: Subject to any disclaimer, the term of this patent is extended or adjusted under 35 U.S.C. 154(b) by 339 days.

This patent is subject to a terminal disclaimer.

(21) Appl. No.: 11/215,546

(22) Filed: Aug. 29, 2005

(65) Prior Publication Data

US 2005/0283741 A1 Dec. 22, 2005

Related U.S. Application Data

(63) Continuation of application No. 09/465,982, filed on Dec. 16, 1999, now Pat. No. 6,976,229.

(51) Int. Cl.
*G06F 3/00* (2006.01)

(52) U.S. Cl. .................. 715/719; 715/737; 715/780; 715/723; 715/835; 382/305

(58) Field of Classification Search ................. 715/719, 715/737, 738, 780, 723, 835, 730, 838, 731, 715/732, 724, 716; 382/305; 358/442
See application file for complete search history.

(56) References Cited

U.S. PATENT DOCUMENTS

| 5,404,316 | A | 4/1995 | Klingler et al. |
|---|---|---|---|
| 5,717,879 | A | 2/1998 | Moran et al. |
| 5,917,488 | A | 6/1999 | Anderson et al. |
| 5,966,122 | A | 10/1999 | Itoh |
| 5,999,173 | A | 12/1999 | Ubillos |
| 6,084,582 | A | 7/2000 | Qureshi et al. |
| 6,097,389 | A | 8/2000 | Morris et al. |
| 6,097,431 | A * | 8/2000 | Anderson et al. ........ 348/231.7 |
| 6,121,966 | A | 9/2000 | Teodosio |
| 6,166,735 | A | 12/2000 | Dom et al. |
| 6,333,752 | B1 | 12/2001 | Hasegawa et al. |

(Continued)

OTHER PUBLICATIONS

Ullmer, Brygg, et al, "mediaBlocks: Physical Containers, Transports, and Controls for Online Media," Computer Graphics Proceedings (SIGGRAPH'98), Jul. 19-24, 1998, 8 pgs.

*Primary Examiner*—Weilun Lo
*Assistant Examiner*—Mylinh Tran
(74) *Attorney, Agent, or Firm*—Blakely, Sokoloff, Taylor & Zafman LLP

(57) ABSTRACT

A method and system for digital story authoring, viewing and storing is described. A display showing an imported story track, an authored story track, and a story-in-progress track. Each story contains one or more objects. The display also shows a large photo corresponding to a selected object in a story. Furthermore, the display also provides visual forms showing audio clips associated with the large photo displayed. The photo may have more than one associated audio clips. Control buttons are available to navigate among the three tracks and among the objects on each track. Other control buttons allow a user to record audio clips and to author new stories.

18 Claims, 7 Drawing Sheets

U.S. PATENT DOCUMENTS

| | | |
|---|---|---|
| 6,346,951 B1 | 2/2002 | Mastronardi |
| 6,362,900 B1 | 3/2002 | Squilla et al. |
| 6,369,835 B1 * | 4/2002 | Lin .......................... 715/726 |
| 6,453,078 B2 | 9/2002 | Bubie et al. |
| 6,567,980 B1 * | 5/2003 | Jain et al. .................... 725/61 |
| 6,624,826 B1 | 9/2003 | Balabanivic |
| 6,683,649 B1 * | 1/2004 | Anderson ............. 348/333.05 |
| 6,686,970 B1 * | 2/2004 | Windle ....................... 348/584 |
| 6,961,954 B1 * | 11/2005 | Maybury et al. .............. 725/53 |
| 7,124,366 B2 * | 10/2006 | Foreman et al. ............. 715/719 |

\* cited by examiner

```xml
<?xml version="1.0" ?>
<families>
  <family id="balabanovic">
    <everything-track id="http://Server10/meta6.xml" />
    <stories-track id="http://Server11/meta7.xml" />
    <current-track id="EMPTY" />
    <users>
      <user id="marko" />
      <user id="janet" />
      . . .
    </users>
  </family>
  . . .
</families>
```

FIG. 4

```
<?xml version="1.0" ?>
<story>
  <image>
    <photo metadata="http://Server1/meta1.xml"/>
    <type type="STORY"/>
    <down metadata="http://Server7/meta3.xml"/>
  </image>
  <image>
    <photo metadata="http://Server8/meta4.xml"/>
    <type type="STORY"/>
    <down metadata="http://Server9/meta5.xml"/>
  </image>
  . . .
</story>
```

```
<?xml version="1.0" ?>
<story>
  <image>
    <photo metadata="http://Server1/meta1.xml" />   — 525
    <type type="DOCUMENT" />
    <audio-pointer>
      <audio storeid="http://Server4/clip1.au" offset="0" />
    </audio-pointer>                                     535
  </image>
  <image>
    <photo metadata="http://Server5/meta2.xml" />   — 530
    <type type="DOCUMENT" />
    <audio-pointer>
      <audio storeid="http://Server6/clip2.au" offset="23" />
    </audio-pointer>                                     540
  </image>
  . . .
</story>
```

METHOD AND APPARATUS FOR STORYTELLING WITH DIGITAL PHOTOGRAPHS

This is a continuation of U.S. patent application Ser. No. 09/465,982, filed on Dec. 16, 1999 now U.S. Pat. No. 6,976,229, entitled "Method and Apparatus for Storytelling with Digital Photographs," incorporated by reference herein and assigned to the corporate assignee of the present invention.

FIELD OF THE INVENTION

The present invention relates generally to field of image retrieval and organization. More specifically, the present invention is directed to multimedia creation using digital objects (e.g., images).

BACKGROUND

Photographs play a central role in many types of informal storytelling. One of the most common and enjoyable uses for photographs is to share stories about experiences, travels, friends and family. Almost everyone has experience with this form of storytelling, which ranges from the exchange of personal reminiscences to family and cultural histories. The World Wide Web can facilitate the sharing of such stories in digital form and has inspired a movement towards "digital storytelling." Stories in digital form are referred to herein as digital stories. Digital photographs have an advantage over print photographs in that users can search for and retrieve them both by their content (e.g., features such as color and texture) and by their metadata (e.g., user-supplied text annotations). Today, most digital stories are created by people with computer skills using special-purpose software for editing images and authoring Web pages. Furthermore, these digital stories are created on systems relying on graphical interfaces dependent on windows, or tables, and some type of pointing or cursor control device. Such systems are typically not portable and are complex to use. These features make these systems difficult to share. These systems also require significant training and are inadequate for mass consumer use.

SUMMARY OF THE INVENTION

A method and system that combines capabilities for storing, authoring, and viewing various forms of digital media are described. In one embodiment, a visual interface having three areas is provided. The first area displays three tracks of images. One track displays images that are stored on the device. A second track displays images of authored stories. The third track displays one or more images associated with a story currently being authored on the device. Control buttons are available to navigate among the three tracks and among the images on each track.

The second area of the visual interface displays a larger version of an image corresponding to a thumbnail image selected in any of the three tracks in the first area.

The third area of the visual interface displays a representation of one or more audio clips and other information associated with the image being displayed in the second area of the visual interface.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIG. 4 illustrates an exemplary XML metadata file that the system reads upon initialization of the system.

FIG. 5A illustrates an exemplary XML metadata for a story.

FIG. 5B illustrates another exemplary XML metadata file for a story.

DETAILED DESCRIPTION

Figure 1:
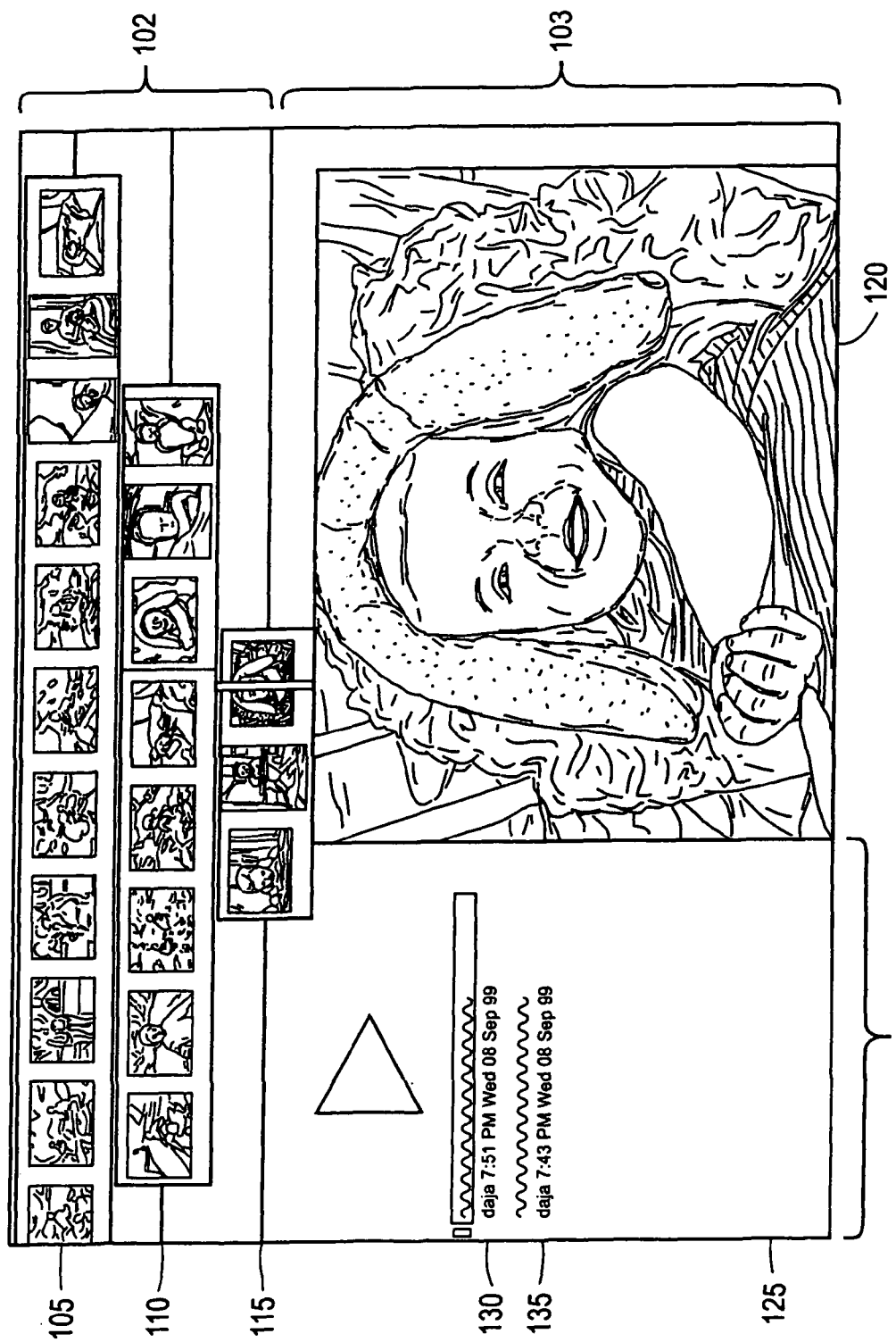
FIG. 1 illustrates an exemplary embodiment of the display screen of one embodiment of a digital story-telling system.

A multimedia story creation and playback system is disclosed. The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Overview

A multimedia storytelling system that provides a user capabilities to share digital photographs and stories. In one embodiment, the system allows the user to seamlessly switch between browsing, viewing, authoring, and playing back the photographs and/or stories. In one embodiment, a multimedia storytelling system includes three components: a storage component, a display component, and an interaction component. The storage component stores digital media objects which are displayed by the display component. The system provides the interaction component (e.g., control buttons) that allow a user to navigate the digital media objects and create stories, or playlists. For purposes herein, a story, or a "playlist", is an ordered collection of digital media objects, such as, for example, images or video clips, with one or more narration tracks. Imported stories on the top track may be merely a single photograph with or without a narration track. Photographs may be imported in batches, similar to that of a roll of film. Similarly, a collection may comprise the images of multiple pages in a single document. Thus, although these may not be a narration track, the imported collection of photographs or single photograph may represent a story for purposes herein.

In one embodiment, the digital media stored in the system includes photographs, images, audio and video clips. The digital media may include raw objects, such as, for example individual photographs, as well as authored objects that combine multiple forms of media into integrated stories. An example of an authored object is a sequence of photographs with an audio, or narration, clip associated with or accompanying the photographs. In one embodiment, the time of capture for an object is known and is stored along with the object in the system.

New objects may be input into the system automatically without requiring any action from the user. New objects are input into the system using one or more sources, such as, for example, on flash memory cards containing digital photographs, video capture camera, reading digital photographs or video clips from floppy or CD-ROM drives, network (e.g., Web) downloads, etc. In one embodiment, the user inserts a flash memory card into a slot in the system and the photographs from the flash memory card are automatically copied and stored in the system. In another embodiment, the system is able to receive email messages with attached photographs and stories. The photographs and/or stories are then automatically accessible. It would be apparent to one skilled in the art the various ways multimedia objects may be input into the system.

A narration may take a variety of forms, such as, for example, recorded audio, digital ink, or typed notes. In one embodiment, a narration track may apply to a single object or to a number of objects (e.g., a narration track for a sequence of images). There may be multiple narration tracks for a single object. That is, the same digital object (photograph) may have several associated narrations.

The display component of the system provides multiple tracks displaying digital media objects to the user. One track displays digital media objects that are stored in the system. A second track displays digital media objects that have been integrated into authored stories. The third track displays one or more digital media objects associated with a story currently being authored using the system.

The display component of the system also allows the user to navigate through the objects in storage. This may include being able to browse through raw objects (e.g., objects without narrations associated or attached thereto), browse through stories, and play back previously created stories. In one embodiment, playing back a story involves showing the user a slideshow of images along with any accompanying narrations.

The interaction component of the system allows the user to create new stories. In one embodiment, the user may create new stories using one or more of several approaches. For example, a user may author a story by starting with an empty or blank story, selecting objects to add to the story, and adding narrations to individual objects or a range of objects. The selection of objects and the addition of narrations may be performed in any order. A user may author a new story by performing edit or delete operations on an existing story.

In one embodiment, the system has a modeless interface, giving the users an interface of a small number of buttons and no pointing device or touchscreen. In another embodiment, the system may be implemented on a typical desktop computer or on a standalone appliance. The user controls for such a system may utilize standard input devices, such as, for example, a mouse, a keyboard, a touchscreen, a touch pad, or a physical control environment of buttons and/or sliders designed specifically for the interaction described herein.

FIG. 1 illustrates one embodiment of a display screen and interface of a system. Media objects may be loaded onto the system from various sources, such as, for example, digital cameras, digital video capture, microphones, scanners, or may be created on the system itself. These objects are then stored in the system on a storage medium (e.g., random access memory, a hard drive, flash memory).

As illustrated in FIG. 1, the system provides a visual interface 100 which splits the screen into three general areas. In one embodiment, the first area 102 at the top of the screen, the second, or central, area 103 at the bottom right side of the screen, and the third area 104 at the bottom left side of the screen.

The first area 102 provides a graphical representation for browsing and navigating through media objects (e.g., photographs, etc.). In one embodiment, there are three horizontal tracks of thumbnail images, tracks 105, 110 and 115, each of which can be navigated by scrolling.

In one embodiment, the top track 105 shows images of existing photographs ordered by time of creation (or other such features). The time of creation may be indicated by time stamps. These may be grouped into "rolls of film" or other natural clusters. In the case of scanned prints, imported stories may correspond to literal rolls of film. In the case of digital photographs, the photographs may correspond to a set of photographs downloaded from the camera in one session. The top track 105 may also display all or many existing photographs currently stored in the system. That is, any image stored on the system may be displayed. The photographs displayed in the top track 105 may be stories. For example, one or more of the photographs in the top track 105 may be an imported story.

In one embodiment, the imported stories may be generated automatically as a result of a database query. For example, a database query for "all images stored on a device containing blue" returns images having the "blue" identifier. The resulting images are then imported into the system. Note that there is no requirement that the first track 105 include any stories at all. That is, the first track 105 may contain zero or more stories, each of which having one or more images.

Within an imported story, the photographs are ordered chronologically. Photographs from digital cameras may be ordered according to when they were taken, while images scanned from print photographs are ordered by scanning time. In one embodiment, in order to distinguish separate stories, the system uses alternating background colors with each color corresponding to different story.

The middle, or second, track 110 contains authored stories, each including a sequence of one or more photographs selected by an individual. Each story appears as a sequence of thumbnail images. In one embodiment, the imported and authored stories are ordered according to their time of creation with separate stories being visually distinguished using different colored backgrounds. In another embodiment, stories in a track may be separated by spaces in the display. The size of the spaces may depend on the length of time between the story creation times. For example, in one embodiment, photographs taken on the same day are closer together on the second track 110 than those separated by a day or a weekend. The space may be a function of a time duration, but not necessarily linear. For example, there might be set increments for "day", "weekend", "week" and "more than a week".

The bottom, or third, track 115 represents a story being authored. That is, the bottom track 115 includes a working set of thumbnail images that have been selected and manipulated by the user. The set of images may only appear in the bottom track 115 for the current session with the system. If the user wishes to further author a story after a session has ended, the user selects the authored story for inclusion into the bottom track 115.

In one embodiment, a thumbnail image appears in the bottom track 115 if it has been added to the working set by pressing one or more control buttons (e.g., either of the + (add) or record buttons, as detailed below). At any time, the story being authored has a pending status. When the story is completed and saved by the user, it joins the set of authored stories in the middle track 110. In one embodiment, the middle track 110 and the bottom track 115 need not be visually distinguished, nor for that matter, any of the tracks.

The display of the three tracks 105, 110, and 115 enables an essentially modeless interface where a user can simultaneously view authored stories, view/navigate through photographs and view/create new stories. The display also provides helpful context for viewing the current image. For example, when the user selects a thumbnail and views an image from one story, adds it to the current story, then adds annotation, the context of that image with the surrounding thumbnails in both the original and current story remains visible and helpful for annotation.

In one embodiment, each thumbnail image appears exactly once in the top track 105. It may appear in any number of stories in the middle track 110 and appears in the bottom track 115 only if it has been explicitly added to or annotated as part of the story currently being authored.

In a typical interaction, the user comes across a thumbnail image and adds it to the working set (bottom track 115). The users may also record a related voice narration to accompany the selected thumbnail image. At the end of the session, all the thumbnail images in the bottom track 115 are grouped into a single story, and the story is then appended or added to the middle track 110.

The central area 103 of the screen display shows a large image 120. The large image 120 corresponds to a thumbnail image of a story or photograph currently being selected in the tracks in the first area 102. This allows the user to view photographs at a size that is comfortable and enjoyable (as opposed to the smaller thumbnail versions in tracks 105, 110 and 115). In another embodiment, other objects may require other display characteristics.

The third area 104 of the screen display shows the available audio narrations of the photograph currently displayed in the central area 103. In another embodiment, other information, such as, for example, creation date may also be displayed in the third area 104. As shown in FIG. 1, there are two narrations 130 and 135 available for the photograph 120 in the central area 103 indicated by the depiction of the wave signal. In one embodiment, each narration has a visual display corresponding to the length of time of the narration (e.g., the longer the signal wave the longer the narration), together with related recording information, such as, for example, time and date recorded, and the name of recording user.

Figure 2:
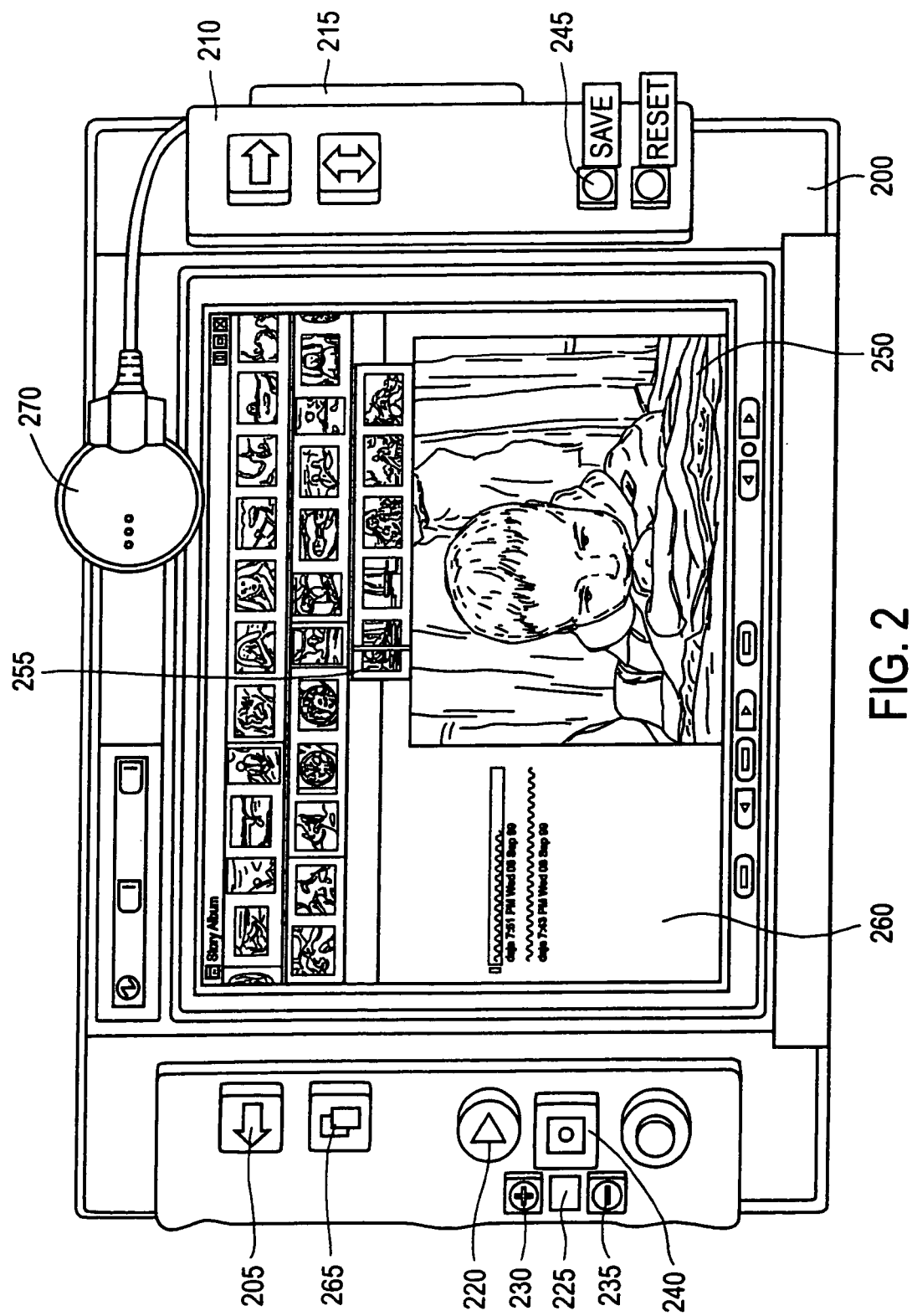
FIG. 2 illustrates an exemplary embodiment of control buttons of the digital story-telling system.

FIG. 2 illustrates an exemplary embodiment of the control buttons and the display of a system for creating and/or viewing multimedia stories. In one embodiment, the control buttons are integrated into and positioned at the sides of the body of the system to enable the user manipulate the controls while holding the system in two hands. This further removes the need for a keyboard, mouse, or other device that forces the user to let go of the system.

As illustrated in FIG. 2, the control buttons in this embodiment include navigation buttons such as a scroll left button 205 to scroll the images in a selected track to the left, a scroll right button 210 to scroll the images in a selected track to the right, and a track selection button 215 to select the track to scroll. In one embodiment, a jog shuttle is used to control scrolling.

In one embodiment, a colored (e.g., yellow) vertical line 255 indicates the selected track and the selected thumbnail image of this track. The vertical line 255 is shown in the first thumbnail image of the bottom track. The selected thumbnail image corresponds to the large image displayed in the central area 250. The track selection button 215 moves the vertical line 255 between the three different tracks.

When either of the scroll buttons 205 or 210 is pressed, the new selected thumbnail image on the current track either to the left or to the right side of the previously selected thumbnail image is selected and displayed in the central area 250. As a different thumbnail image moves under the vertical line 255, the corresponding image is displayed in the central area 250. Note that any type of indicator or indication may be used on the screen to select an image. It should also be noted that while in one embodiment, the scroll button 205 or 210 causes the images in the track with the vertical line 255 to move to the left or right while leaving the vertical line 255 in place, the system could keep the images in place while moving the vertical line 255 to select an image. In one embodiment, the navigation between the images may be controlled by an external joystick communicating with the system through a joy stick interface.

In one embodiment, the user may quickly traverse the thumbnail images on a track by using variable-speed scrolling. At standard speed, the display appears as shown in FIG. 2. In one embodiment, standard speed refers to pressing one time on the left scroll button 205 or the right scroll button 210. This moves the track by exactly one thumbnail image. Faster scrolling speeds may be enabled by rendering low resolution versions of the thumbnail images that are quickly accessible from a separate index in the system and by not rendering the image in the central area 250 or the narrations in the audio area 260. In one embodiment, such images may be cached in memory to increase access speed. To increase scrolling speed, the user may need to hold down a scroll buttons 205 or 210 for a longer period of time. When this occurs, the images appear to be scrolling faster by the vertical line indicator 255.

Figure 3:
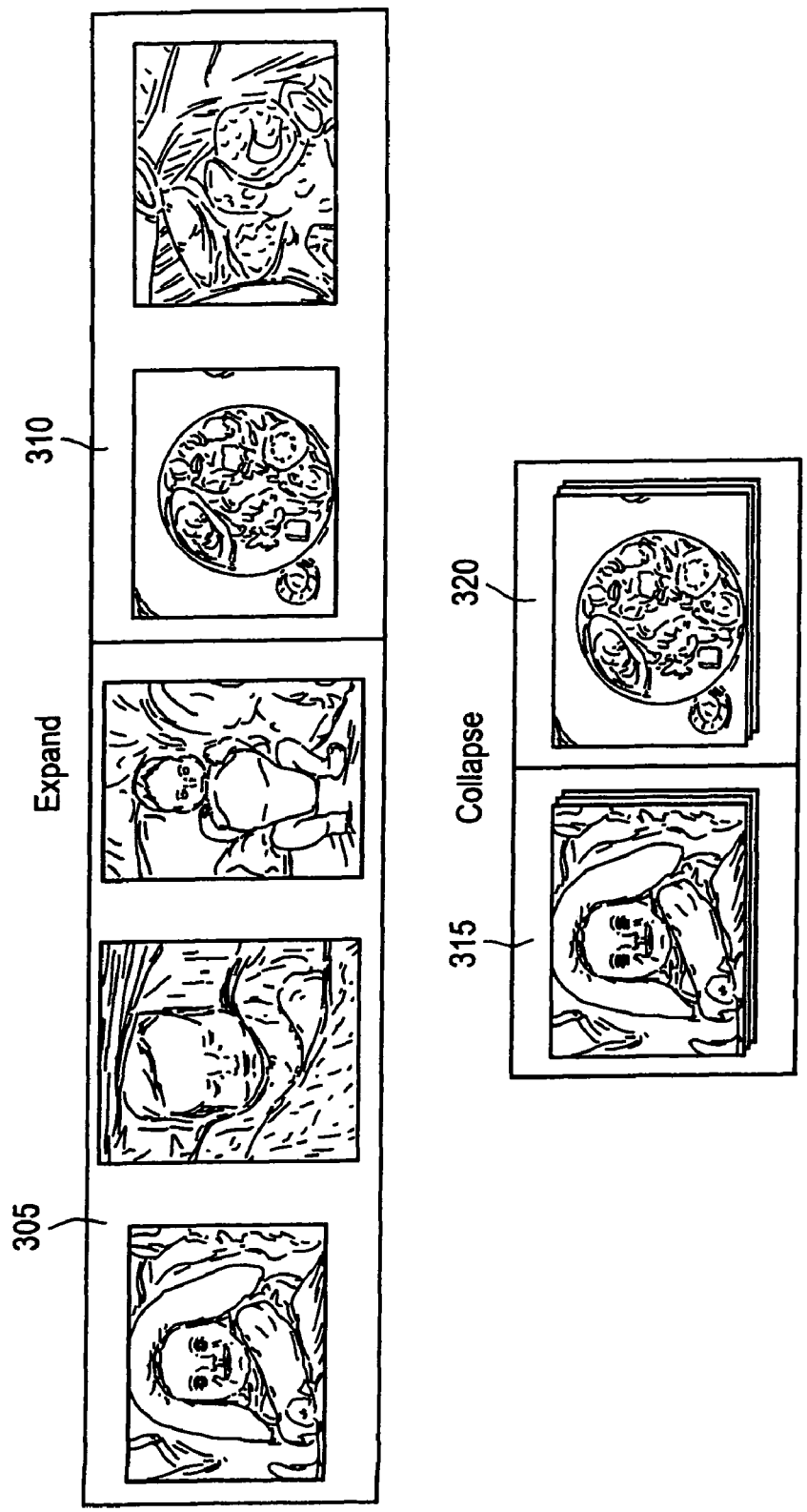
FIG. 3 illustrates an exemplary expand/collapse view of a story.

In one embodiment, an expand/collapse button 265 controls the view or the number of photographs displayed for each story on one of the three tracks. In the expanded view, every thumbnail image in a story is shown. In one embodiment, the expanded view is the default view. In the collapsed view, each story is represented by a predetermined number of thumbnail images (e.g., one thumbnail image). In one embodiment, a first thumbnail image of the story is used to represent the story. The collapsed view allows for faster navigation. FIG. 3 illustrates an exemplary expand/collapse view of a story. Referring to FIG. 3, the two stories 305 and 310, with thumbnail images belonging to one story having the same colored background, are shown in expanded form. The same two stories are illustrated in collapsed form in thumbnails 315 and 320, with the first thumbnail image of each story 305 and 310 being used as the thumbnail image in the corresponding collapsed form.

Referring back to FIG. 2, the cluster of buttons at the bottom left of the system 200 provides the user with additional controls for authoring, browsing and playing back of stories. A play button 220 is used to enter a play mode to allow an individual to view existing stories. During the play mode, the system starts playback from the currently selected thumbnail image. In one embodiment, although not necessary, each thumbnail image has an audio clip associated with it as part of a story in which it resides. Furthermore, each thumbnail image may be part of more than one story, and thus may have more than one audio clip associated with it, one audio clip for each story. However, an audio clip may or may not contain any recorded narration. If a narration exists, it is played through a built-in loudspeaker in the system (not shown). If there is no recorded narration, there will be a pause of a certain length of time, for example one second. After the narration is played or after the pause (due to not having the narration), the selected track automatically scrolls forward to a next thumbnail image in the story. In one embodiment, the next thumbnail image is determined based on a default viewing and storytelling direction of left-to-right. If the user navigates to a new thumbnail image while the system is playing, for example scrolling left or right, changing to a different track, playback of the currently playing audio clip is stopped. If the user takes no further action for a brief length of time (e.g., one second), the system plays the audio clip associated with the newly selected thumbnail image and continues with that story from that point on.

As discussed above, the selected thumbnail image may have more than one associated audio clip and corresponding narrations. Whenever a thumbnail image is selected, all of the audio narrations associated with that thumbnail image are displayed in the audio area 260. In one embodiment, if the selected thumbnail image has more than one associated audio clip, and when the system is playing an audio clip, pressing the play button 220 causes the system to advance to a next audio clip.

Referring to FIG. 1, there are two available narrations for the selected thumbnail image, narration 120 and narration 125. Each narration is marked with the time of recording and the name of the recording user. The length of the wavy lines is proportional to the duration of the audio. The narration associated with the selected story is listed first, as in narration 120. Referring to FIG. 2, the narration associated with the selected story is played by default when the play button 220 is pressed. Pressing the play button 220 multiple times in quick succession selects one of the alternate audio clips and playback "jumps" to the corresponding story, providing a method of automatic hyperlinking between stories.

The system remains in the play mode until the stop button 225 is pressed or until the end of story is reached. When this occurs, the system enters into stop mode. While in the stop mode, no audio clip is played by the system.

In one embodiment, while the system is in the play mode, the remove (−) button 235 has no effect on the play mode of the system. However, pressing the add (+) button 230 adds the currently displayed image to the working set. Thus, the system appends the currently displayed image to the working set, but it does not stop the play mode. Furthermore, if the user presses the save button 245 while the system is in the play mode, the system stops playing the audio clip and performs a save operation. Furthermore, if the user presses the record button 240 while the system is in the play mode, the audio clip is stopped.

In one embodiment, while in the authoring mode (not the play mode) a story may be created by pressing the + (add) button 230 when the vertical line 255 is positioned over a particular thumbnail image to append a copy of that currently selected thumbnail image onto the working set or the bottom track 115. The − (remove) button 235, conversely, removes the selected thumbnail image (i.e., the image over which the vertical line 255 is positioned) from the working set on the bottom track 115.

While in authoring mode, pressing the record button 240 starts the recording function. While the recording function is active, the audio recorded by the microphone is stored and associated with the currently displayed thumbnail image in the working track. In one embodiment, this is done by making a link in the underlying XML file. If the thumbnail image is not already in the working set, it is appended before the recording begins, as though the + button 230 was pushed first. If the selected thumbnail image is already on the working track, the new recording overwrites any previous recording associated with the thumbnail image in the story being authored. While recording, if the user selects a new thumbnail image, such as, for example by scrolling left or right, by changing to a different track, or by pressing the expand/collapse button, the recording continues for the audio clip associated with the new thumbnail image. In addition, the new thumbnail image is appended to the working track, if it is viewed for more than a short time, (e.g. 1 second). However, if the user scrolls left or backward, but still remains on the working track, recording is automatically stopped. This prevents accidental erasures. In other embodiments, the new thumbnail image is inserted at a point before or after the thumbnail image last selected on the working track (e.g., the center image of track 3). In this situation, recording continues starting with the audio clip associated with the new inserted thumbnail image. Furthermore, pressing the play button 220 also stops the recording mode and put the system in the play mode. This makes recording a story as similar to viewing a story as possible.

In another embodiment, the system may include a touch-screen or a pointing device (e.g., cursor control device). In this case, while in the recording mode, the user's pointing gestures would be captured. During playback, areas that had been pointed to are highlighted at appropriate times. One way to perform highlighting is to darken the rest of the image. Alternatively, a semi-transparent overlay can be used (e.g., a yellow circle).

When the system is in the stop mode, the user may drag thumbnail images from one track to another, or the user may drag thumbnail images to different points within a story. Alternatively, a dragging operation can be used in place of scroll left/right to move all or multiple images in a track at the same time.

Pointing to a particular thumbnail selects the thumbnail image, selects the track the thumbnail image is on, and displays the corresponding large image in the central area 250. In another embodiment, touching the screen may highlight an image in a track but not select it.

In one embodiment, the recording operation supports both "select then narrate" and "select while narrating" strategies. In "select then narrate" strategy, the users may compose a story by first selecting a working set of thumbnail images using the + button 230 or the − button 235 and then annotating each thumbnail images in order. Alternatively, in the "select while narrating" strategy, the users may continuously record narrations while navigating and selecting photos. When recording is active, each new photograph that a user views for longer than a short time interval is automatically added to the working set along with any recorded input. This supports the "select while narrating" strategy. For sound recording, in one embodiment, a microphone 270 is attached to or integrated into the external body of the system. In another embodiment, the device is equipped with a speech recognition software to translate audio narration into text.

The group of buttons at the bottom right of FIG. 2 controls story operations. The save button 245 "saves" the current working story that is displayed on the bottom track by moving it to the end of the middle track. Note that the current state of the system is also saved to the system storage device at that time. The XML files (or equivalent representations) along with audio clips may be stored in memory (e.g., RAM) and written out to a hard disk when saved. (They may also be written out at other times.) In another embodiment, the user would also have the option of electronically sending a completed story to another user for viewing on a similar system or on a regular PC via a media player application or standard Web browser. In another embodiment, a "print" button allows the user to print a selected image on a locally connected, via wire or wireless technology, printer or a remote device.

In one embodiment, the system has an attached image creation/capturing device (e.g., a video camera). The video camera can point inward at the holder of the system or it can point outward. A take-picture button on the system allows the user to take a still image from the camera, time-stamp, and add the image to the top track. In another embodiment, an image of the narrator is automatically grabbed by the camera at the beginning of every recording session, or at pre-set intervals, or every time the video input changes by more than some predetermined threshold. Using the video camera, the images captured by the video camera may be added to the first track 105 and available for inclusion in authored stories like all other objects in the system.

In one embodiment, stories and metadata about photographs are stored on the storage device in Extensible Markup Language (XML). FIG. 4 illustrates an exemplary XML metadata file that the system reads during initialization. The initializing metadata file 400 is stored in a predetermined known location on the storage device. In one embodiment, the initializing metadata file is named "families.xml" and the location of the file is determined using a local Uniform Resource Locator (URL) corresponding to the file on the storage device of the system. For each possible group (e.g., family) using the system, the initializing metadata file contains pointers to the stories corresponding to the three tracks. For example, the metadata file of FIG. 4 points to a story file 405 "meta6.xml". In one embodiment, the initializing metadata file also maintains further administrative functions, such as, for example, user ids and passwords to prevent unauthorized viewing of personal stories. In one embodiment, the initialization file contains user specific information. In another embodiment, the system assumes a single user.

FIG. 5A illustrates an exemplary XML metadata for a story. The XML metadata file for story 500 points to two other stories, "meta3.xml" 505 and "meta5.xml" 510. Note that each metadata file has an associated "type" attribute having a value of either "story" or "document" indicates single object.

FIG. 5B illustrates another exemplary XML metadata file for a story. Metadata file 520 represents the story "meta3.xml" 505 pointed to by the metadata file 500. Metadata file 520 has a list of photographs shown as "meta1.xml" 525 and "meta2.xml" 530. Note that the photograph references are in the form of the URL of the corresponding metadata XML file. Each photograph may also have an associated audio clip shown as "clip1.au" 535 and "clip2.au" 540. In one embodiment, the offset attribute of the audio tags associated with audio clip 535 or audio clip 540 specifies a starting location of the referenced audio narration (such as when, for example, one audio file contains more than one user-supplied audio narration) within the audio file and is measured in milliseconds.

Figure 6:
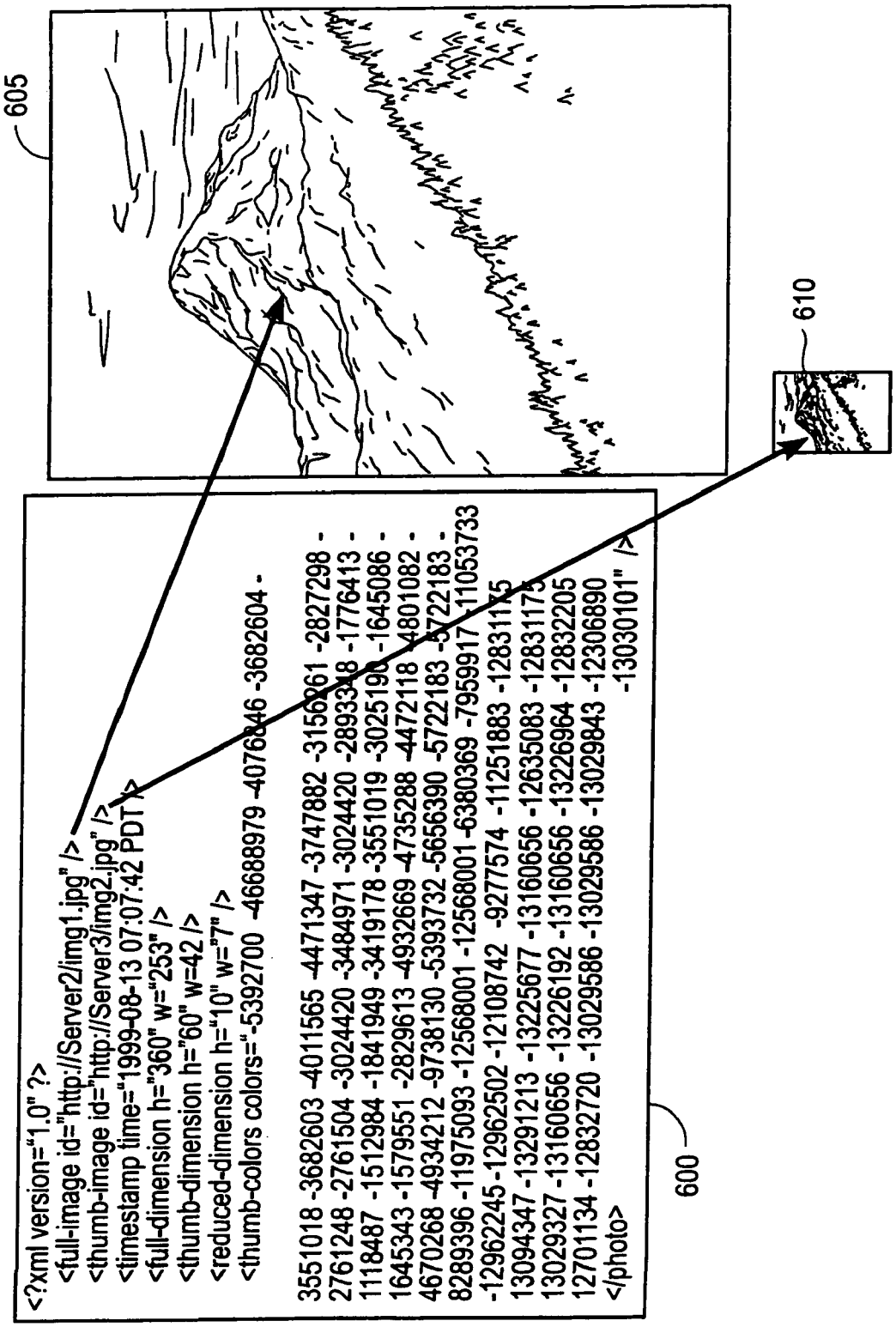
FIG. 6 illustrates an exemplary XML metadata file for a single photograph.

FIG. 6 illustrates an exemplary XML metadata file for a single photograph. Metafile 600 represents the image "meta1.xml" pointed to by the metafile illustrated in FIG. 5B. Metafile 600 includes URLs that point to two image files, a full size image 605 that may be used in area 103 of the display and a thumbnail image 610 that may be used in the tracks 105, 110, and 115. In addition, the metafile 600 includes color data for a reduced representation. The reduced representation of the image may be rendered either as a thumbnail image or as a full size.

In one embodiment, using XML allows for easy translation to other formats such as Hypertext Markup Language (HTML) or Synchronized Multimedia Integration Language (SMIL). This enables stories to be shared with others and viewed on different devices. The SMIL format is especially appropriate as it allows the synchronization of audio with a series of images to match the structure of the stories. Using any of these formats, a story including the associated photos and audio clips can be saved in a file. The file may then be uploaded to a web server and assigned a unique URL. The URL may then be sent on the web to specified recipient or list of recipients by email using the standard email protocols, for example SMTP. In one embodiment, to send the electronic mail (email), the system provides a network interface, for example Ethernet, modem, or wireless. Alternatively, the file may be sent to the recipient(s) as an email attachment using a standard attachment encoding technique, for example Multipurpose Internet Mail Extensions (MIME).

In one embodiment, the email address of the recipients may be specified using the scroll left/right and the add (+)/remove (−) buttons. These buttons are used to navigate among letters and punctuation symbols displayed on the top track 105. An email address may be constructed on the bottom track 115. The middle track may be used to display previously saved email addresses. Email addresses of people who send stories to the users may automatically be added to the second track. Furthermore, the system may accept input email addresses through a "contact" file or vCard file (a Personal Data Interchange (PDI) technology developed by the Versit Consortium) beamed by IR from a PDA (e.g., a Palm Pilot). To generate a new email address, the user may use a stylus to type on an on-screen keyboard. Using the stylus, handwriting recognition software, for example Graffiti by Palm Computing, may be used to recognize the user's handwriting. Alternatively, the user may use an external keyboard plugged into a keyboard interface provided by the system. Besides sending stories to email recipients, the system may also automatically check for new stories, for example, in the form of email messages or a predetermined web page listing new stories sent to the device/owner, at set intervals or at set times of day. The system may also automatically download any new stories or messages.

In one embodiment, the system includes a cradle or docking station that includes power and network interface. In one embodiment, all communication (sending/receiving messages) is queued for execution when the system is docked. The communication then occurs automatically when docked. In one embodiment, while the system is in the cradle or otherwise unused for a set period of time, an auto play screen saver feature is activated causing the screen to cycle through all the stories in the system.

In one embodiment, the system may create a movie file using the images and the associated audio clips in synchronization with each other, just as they are shown on the system when the user presses the play button. The movie file may then be stored in a standard format, such as, for example MPEG, AVI, or QuickTime, and may then be sent to the recipient(s) as an email attachment. In another embodiment, the author of a story may choose to send his or her own photograph to be associated with a story when the story is sent to a recipient. A link to this photograph is included and associated with the email. When the recipient views the email, the photograph of the author is displayed in an image slot. Alternatively, the photograph associated with the author might also be displayed as the first photograph in a story, or somehow combined with the first photograph especially for the collapsed view.

As discussed above, the system may accept as input media objects from various sources. In one embodiment, other media objects, for example video clips, presentation slides, pages of documents, web pages, and audio clips may also be loaded onto the system. With the video clips as input, an incoming video stream can be captured through a standard analog video capture board, or via a "firewire" (IEEE 1394) interface, or by direct connection to an already-digitized video file, for example a MPEG file, or a QuickTime file. The stream can then be segmented into clips using standard scene-change detection algorithms. Each clip can then be treated as a photograph. Furthermore, each clip may already have an associated audio segment from the original video source. In this embodiment, pressing the play button enables the system to play both the audio segment and the video clip synchronized with each other. The system then moves on to a next clip of the story. A first frame of the video clip may be used as a thumbnail image representing the video clip.

With presentation slides as input, the system creates an image for each presentation slide. The presentation slides may have been generated by presentation software (e.g., Powerpoint) or other document or graphics editing tools. The story is then viewed on the system as a sequence of slides, similar to a presentation. With the pages of document as input, a story in the top track corresponds to the pages of an original document, in order. A story in the middle track is a collection of reorganized pages with added audio commentary, for example a summary. Documents can easily be imported from existing formats, both page-based, for example Postscript, or PDF, and linear, for example HTML, or plain text. In the latter case a pagination operation would be required.

With Web pages as input, the top track 115 may contain a user's chronological browsing history. This may be captured by monitoring a Web browser or by acting as a proxy server intercepting and serving all of a user's HITP requests. Each story corresponds to a length of time (e.g., one day or one browsing session, etc.). The second track allows the user to compose and sequence groups of Web pages for easy access and later retrieval. In the second track, a story might correspond to a bookmark folder, a series of pages found in the course of one search, or any other structure as is useful to the user.

With the audio clips as input, the top track may represent "albums" or audio CDs that the user has scanned into the system via a CD-ROM drive, or downloaded from the Web directly as a series of audio files, for example MP3 files from MP3.com, Windows Media Audio files from Microsoft, Liquid Audio files from LiquidAudio.com, RealJukebox files from Real Networks, etc. Each "album" is an ordered set of "songs". The second track represents the user's "playlists" (e.g., the user's own sequences of songs to be played). In this case, there is a default visual representation for each song, or the user chooses relevant icons, or a Web service provides icons to match artist names, song titles or album titles.

Figure 7:
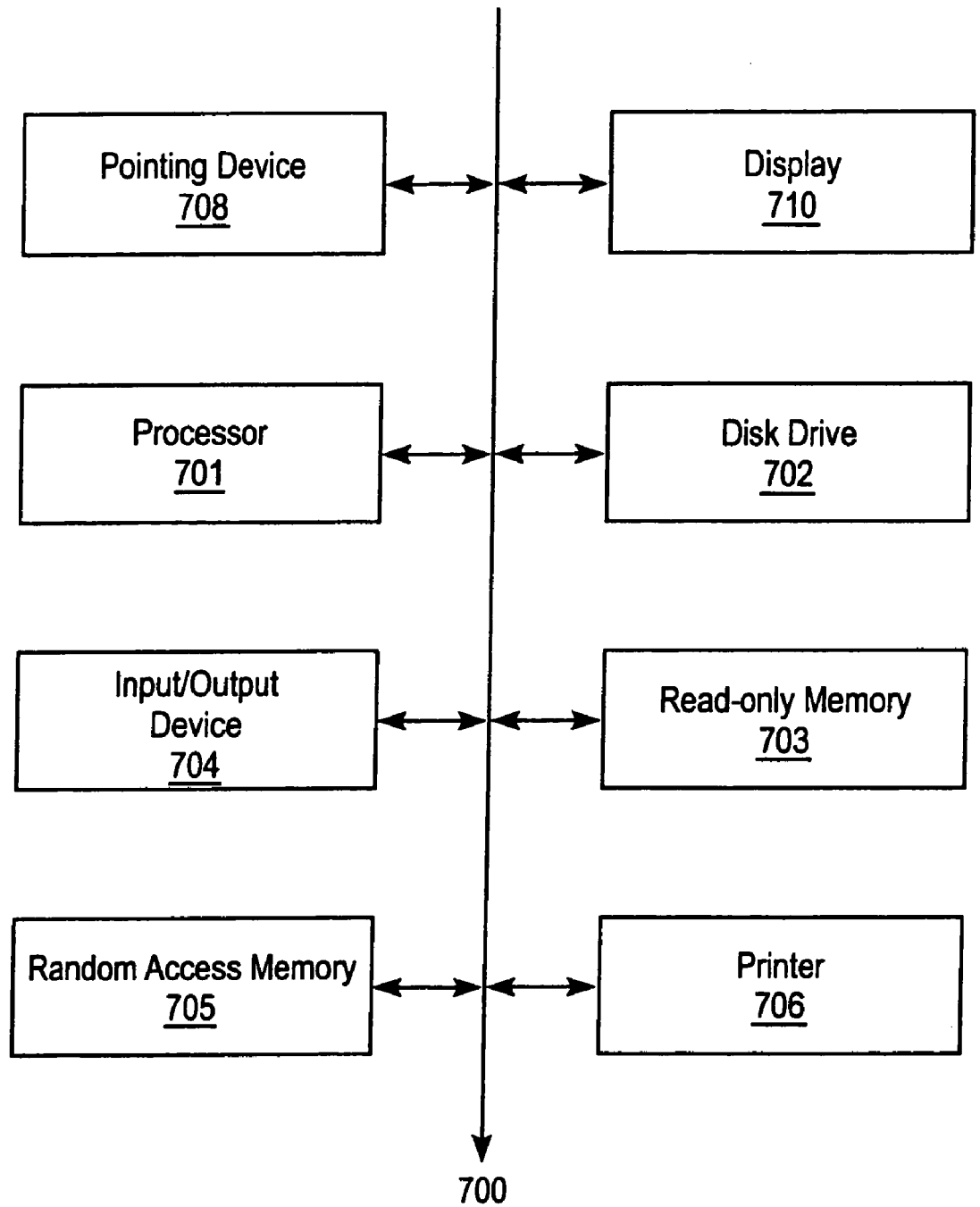
FIG. 7 illustrates an embodiment of an exemplary computer system that comprises the storage, display and interaction components of the digital story creation and play back system.

FIG. 7 illustrates an embodiment of an exemplary computer system that comprises the storage, display and interaction components of the digital story creation and play back system. The various components shown in FIG. 7 are provided by way of example. Certain components of the computer in FIG. 7 can be deleted from the system for a particular implementation of the invention. In other systems, additional components may be added without affecting the scope of the present invention. In other systems, additional components may be added without affecting the scope of the present invention.

FIG. 7 illustrates a system bus 700 to which various components are coupled. A processor 701 performs processing tasks required by the computer. Processor 701 may be any type of processing device capable of implementing the steps necessary to perform the storage, displaying, and interaction capabilities described herein. An input/output (I/O) device 704 is coupled to bus 700 for communicating with other devices coupled to the computer. A read-only memory (ROM) 703 and a random access memory (RAM) 705 are coupled to bus 700 to provide storage for various data and information used by the computer. Although ROM 703 and RAM 705 are shown coupled to bus 700, in alternate embodiments, ROM 703 and RAM 705 are coupled directly to processor 701 or coupled to a dedicated memory bus (not shown).

A video display 710 is coupled to bus 700 and displays various information and data to the user of the computer. A disk drive 702 is coupled to bus 700 to provide long-term mass storage of information. In one embodiment, a pointing device 708 is coupled to bus 700 for entering information and commands to the computer system. In another embodiment two displays may be used, one low resolution display for the 3 tracks and a high-resolution display for the main viewing area. The main viewing area may not be needed for audio and other media.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A computer implemented method, comprising:
   creating, in a display area of a screen of a device, a first set of reduced graphical representations that represent a plurality of digital media objects using one or more other sets of reduced graphical representations accessible using one or more other display areas of the screen, the one or more other display areas comprising a first display area, a second display area, and a third display area;
   associating audio with the first set of reduced graphical representations, such that the plurality of digital media objects and audio are capable of being played back subsequently;
   displaying in the first area, a first, second, and third track, the first track displaying images that are stored on the device, the second track displaying images of authored stories, each authored story including a sequence of digital media objects selected by an individual and having audio associated with at least one of the digital media objects in the sequence, the third track displaying one or more images associated with a story being authored on the device and having audio associated with at least one of the one or more images;
   displaying in the second area, a larger version of an image corresponding to a thumbnail image selected in any of the three tracks in the first area; and
   displaying in the third area, a representation of one or more audio clips associated with the image being displayed in the second area.

2. The method of claim 1, further comprising recording the audio to be associated with one or more of the first set of the reduced graphical representations.

3. The method of claim 2, further comprising displaying a non-numeric graphical representation associated with the recorded audio, the non-numeric graphical representation representing a length of the recorded audio.

4. The method of claim 1, further comprising displaying a list of a plurality of audio capable of being selected and associated with a digital media object.

5. The method of claim 1, further comprising playing back the plurality of digital media objects, wherein each of the plurality of digital media objects that is associated with audio, when played back, the associated audio is played back.

6. The method of claim 5, wherein the plurality of digital media objects is played back sequentially, wherein each of the plurality of digital media objects associated with an audio is played in a duration based on a length of the associated audio before advancing to a next digital media object.

7. The method of claim 1, wherein the plurality of digital media objects are arranged in an order specified by a user and independent of a creation time of the digital media objects.

8. The method of claim 1, further comprising storing the plurality of digital media objects as a presentation package, which when executed, the plurality of digital media objects is played back sequentially as a slideshow.

9. A computer-readable storage medium, having instructions stored therein, which when executed, cause a computer system to perform a method comprising:
   creating, in a display area of a screen of a device, a first set of reduced graphical representations that represent a plurality of digital media objects using one or more other sets of reduced graphical representations accessible using one or more other display areas of the screen, the one or more other display areas comprising a first display area, a second display area, and a third display area;
   associating audio with the first set of reduced graphical representations, such that the plurality of digital media objects and audio are capable of being played back subsequently;
   displaying in the first area, a first, second, and third track, the first track displaying images that are stored on the device, the second track displaying images of authored stories, each authored story including a sequence of digital media objects selected by an individual and having audio associated with at least one of the digital media objects in the sequence, the third track displaying one or more images associated with a story being authored on the device and having audio associated with at least one of the one or more images;
   displaying in the second area, a larger version of an image corresponding to a thumbnail image selected in any of the three tracks in the first area; and
   displaying in the third area, a representation of one or more audio clips associated with the image being displayed in the second area.

10. The computer-readable storage medium of claim 9, wherein the method further comprises recording the audio to be associated with one or more of the first set of the reduced graphical representations.

11. The computer-readable storage medium of claim 10, wherein the method further comprises displaying a non-numeric graphical representation associated with the recorded audio, the non-numeric graphical representation representing a length of the recorded audio.

12. The computer-readable storage medium of claim 9, wherein the method further comprises displaying a list of a plurality of audio capable of being selected and associated with a digital media object.

13. The computer-readable storage medium of claim 9, wherein the method further comprises playing back the plurality of digital media objects, wherein each of the plurality of digital media objects that is associated with audio, when played back, the associated audio is played back.

14. The computer-readable storage medium of claim 13, wherein the plurality of digital media objects is played back sequentially, wherein each of the plurality of digital media objects associated with an audio is played in a duration based on a length of the associated audio before advancing to a next digital media object.

15. The computer-readable storage medium of claim 9, wherein the plurality of digital media objects are arranged in an order specified by a user and independent of a creation time of the digital media objects.

16. The computer-readable storage medium of claim 9, wherein the method further comprises storing the plurality of digital media objects as a presentation package, which when executed, the plurality of digital media objects is played back sequentially as a slideshow.

17. A data processing system, comprising:
   a processor; and a memory for storing instructions, when executed from the memory, cause the processor to perform an operation, the operation including creating, in a display area of a screen of a device, a first set of reduced graphical representations that represent a plurality of digital media objects using one or more other sets of reduced graphical representations accessible using one or more other display areas of the screen, the one or more other display areas comprising a first display area, a second display area, and a third display area;

associating audio with the first set of reduced graphical representations, such that the plurality of digital media objects and audio are capable of being played back subsequently;

displaying in the first area, a first, second, and third track, the first track displaying images that are stored on the device, the second track displaying images of authored stories, each authored story including a sequence of digital media objects selected by an individual and having audio associated with at least one of the digital media objects in the sequence, the third track displaying one or more images associated with a story being authored on the device and having audio associated with at least one of the one or more images;

displaying in the second area, a larger version of an image corresponding to a thumbnail image selected in any of the three tracks in the first area; and displaying in the third area, a representation of one or more audio clips associated with the image being displayed in the second area.

18. An apparatus, comprising:

means for creating, in a display area of a screen of a device, a first set of reduced graphical representations that represent a plurality of digital media objects using one or more other sets of reduced graphical representations accessible using one or more other display areas of the screen, the one or more other display areas comprising a first display area, a second display area, and a third display area;

means for associating audio with the first set of reduced graphical representations, such that the plurality of digital media objects and audio are capable of being played back subsequently;

means for displaying in the first area, a first, second, and third track, the first track displaying images that are stored on the device, the second track displaying images of authored stories, each authored story including a sequence of digital media objects selected by an individual and having audio associated with at least one of the digital media objects in the sequence, the third track displaying one or more images associated with a story being authored on the device and having audio associated with at least one of the one or more images;

means for displaying in the second area, a larger version of an image corresponding to a thumbnail image selected in any of the three tracks in the first area; and means for displaying in the third area, a representation of one or more audio clips associated with the image being displayed in the second area.

* * * * *